United States Patent [19]

Motani et al.

[11] Patent Number: 5,317,033

[45] Date of Patent: May 31, 1994

[54] PROCESS FOR PRODUCING SYNTHETIC RESIN FOAM

[76] Inventors: Shigeru Motani, 1-1-501, 6-chome, Deguchi, Hirakata-shi Osaka, Japan; Tadayuki Saito, 22-37, 3-chome, Higashiimazato, Higashinari-ku, Osaka, Japan; Takahiro Hayashi, 3-3-41-403, Idakano, Higashiyodogawa-ku, Osaka, Japan

[21] Appl. No.: 4,472

[22] Filed: Jan. 14, 1993

Related U.S. Application Data

[63] Continuation of Ser. No. 602,509, Oct. 29, 1990, abandoned.

[30] Foreign Application Priority Data

| Feb. 1, 1990 | [JP] | Japan | 2-24331 |
| Apr. 9, 1990 | [JP] | Japan | 2-94859 |
| Jul. 20, 1990 | [JP] | Japan | 2-193481 |

[51] Int. Cl.$^5$ ............................................. C08J 9/10
[52] U.S. Cl. .................................. 521/79; 521/81; 521/87; 521/88; 521/91; 521/92; 521/120; 521/143; 521/146; 521/148; 521/908
[58] Field of Search .............. 521/79, 81, 87, 88, 521/91, 92, 120, 143, 146, 148, 908

[56] References Cited

U.S. PATENT DOCUMENTS

| 3,962,154 | 6/1976 | Egli | 260/2.5 HA |
| 4,263,050 | 4/1981 | Yamanaka et al. | 524/447 |
| 4,438,224 | 3/1984 | Suh et al. | 521/146 |
| 4,446,253 | 5/1984 | Hahn et al. | 521/79 |
| 4,455,272 | 6/1984 | Schubert et al. | 264/53 |
| 4,456,704 | 6/1984 | Fukumura et al. | 521/79 |
| 4,473,665 | 9/1984 | Martini-Vvedensky et al. | 521/79 |
| 4,522,955 | 6/1985 | Fukushima et al. | 521/143 |
| 4,559,367 | 12/1985 | Hurps et al. | 521/79 |
| 4,632,942 | 12/1986 | Ito et al. | 521/81 |
| 4,888,371 | 12/1989 | Tajima et al. | 521/120 |
| 4,956,395 | 9/1990 | Leduc | 521/79 |
| 4,990,542 | 2/1991 | Motani et al. | 521/79 |

*Primary Examiner*—John Kight, III
*Assistant Examiner*—John M. Cooney, Jr.
*Attorney, Agent, or Firm*—Renner, Otto, Boisselle & Sklar

[57] ABSTRACT

The present invention concerns a process for producing a synthetic resin foam composed of cells having substantially two sizes, one of the sizes being at most 0.3 mm and the other size as being 0.4 to 1 mm, comprising the steps of:

forming a mixture of one or more of a water-absorbent high molecular compound, a cell-controlling agent, a synthetic resin, and water; melting the mixture with heating; incorporating a volatile type foaming agent into the mixture under pressure; and extruding the mixture into a lower pressure space to form a foam.

36 Claims, 2 Drawing Sheets

PROCESS FOR PRODUCING SYNTHETIC RESIN FOAM

This is a continuation of copending application Ser. No. 07/602,509 filed on Oct. 24, 1990, now abandoned.

FIELD OF THE INVENTION

The present invention relates to a process for producing synthetic resin foams, and more particularly to a process for producing extruded foams of a synthetic resin such as polystyrene.

BACKGROUND OF THE INVENTION

Various processes for producing extruded synthetic resin foams hitherto have been known.

Extruded foams are generally produced from a synthetic resin by a so-called extrusion process, i.e. by adding a cell controlling agent to the synthetic resin, kneading the mixture in a molten state with heating, admixing a volatile-type foaming agent (physical blowing agent) with the kneaded mixture, and extruding the resulting mixture into a low-pressure zone to produce a foam by the evaporation of the foaming agent.

Among the foams produced by the above process, the extruded foam of polystyrene is widely used as a heat-insulating material and the like because the foam has a high expansion ratio and a uniform cell structure, and exhibits excellent heat-insulating properties and suitable mechanical strength.

However, since the polystyrene foam prepared by the extrusion process is composed primarily of polystyrene of great rigidity as the base resin, the foam is low in flexibility and still remains to be improved in flexibility.

It is therefore considered useful to adjust the amount of the cell controlling agent and the composition of the foaming agent to be used to give a uniform and subtle cell structure to extruded foams of a synthetic resin such as polystyrene and thereby impart improved flexibility to the foam.

Nevertheless, an attempt to simply decrease the cell size increases the density of the foam under the influence of the surface tension of the cell membrane, so that difficulties are encountered in preparing a synthetic resin foam having a uniform and fine cell structure of low density.

Further if the conventional extrusion process is used for preparing a foam of considerably increased thickness with a reduced cell size, it is known that the cells become more anisotropic in the direction of thickness of the foam to result in impaired heat-insulating properties and lower flexural strength.

In fact, we attempted to prepare a polystyrene resin foam of uniform and fine cell structure by the extrusion process with controlled amounts of foaming agent and cell controlling agent, whereas the decrease of the cell size to not greater than 0.4 mm produced more anisotropic cells, failing to impart the contemplated heat-insulating properties and flexural strength to the foam obtained. When a further increased amount of the cell controlling agent was used to decrease the cell size to 0.2 to 0.3 mm, it became difficult to foam the resin material in the direction of thickness of the foam to be obtained, consequently affording a foam of greatly reduced thickness and entailing the problem that it was difficult to obtain a foam of satisfactory thickness.

Besides the foregoing process, it is also known to produce a foam having different cell sizes by an extrusion process wherein water is forced directly into molten resin within an extruder to foam the resin by the evaporation of water and cool the molten resin with the latent heat of evaporation of water (Japanese Unexamined Patent Publication No. 176226/1983). Since this process employs no means for holding the water microscopically dispersed in the molten resin, the water forced in cannot be thoroughly dispersed in the resin, permitting formation of coarse cells and giving a poor appearance to the product. Although this process appears to afford a foam of a cellular structure having large and small cells in combination, cells of different sizes are conjointly present only in a small quantity locally of the cell structure. Thus, the process in no way provides a foam, wherein cells of different sizes are conjointly present as dispersed approximately uniformly, which is consequently outstanding in heat-insulating properties and bending deflection, as contemplated by the present invention.

Another process has been disclosed for producing a foam of a cell structure with different cell sizes using a water-containing vegetable substance 75 to 500 $\mu$m in particle size, especially pulverized corncobs, to ensure uniform dispersion of water (Japanese Unexamined Patent Publication No. 236839/1986). However, the disclosed process is not satisfactory for the following reasons. When the starting mixture is fed to an extruder, the water-containing vegetable organic substance releases much water. The use of the natural substance inevitably gives a product of unstable quality. Moreover, the difficulty encountered in accurately controlling the water content produces irregularities in the cell structure of the foam extruded. Furthermore, the vegetable organic substance is carbonized during heating and melting within the extruder to color the extruded foam brown and cause the foam to give off an odor.

Under the foregoing situation, we developed foams of cell structure wherein cell membrane form large cells and small cells which are conjointly present as dispersed like islands in the sea (Japanese Patent Application Nos. 170928/1989 and 201018/1989). These foams retain the heat-insulating properties and suitable flexural strength required for foams, exhibit high flexibility and are therefore free from all the foregoing problems.

We have conducted intensive research in order to further improve the thermal properties of the foams previously developed and unexpectedly found that when water is forced into a mixture of the synthetic resin and a water-absorbent high molecular compound along with an evaporable foaming agent after the mixture has been kneaded in a molten state with heating, small cells can be made still smaller to impart improved heat-insulating properties to the resulting foam.

Our research further carried out has revealed that in the case where a phenolic antioxidant is mixed with the synthetic resin along with the water-absorbing high polymer compound, and the volatile-type foaming agent is forced into the mixture with addition of water during the mixing, or while or after the mixture is kneaded in a molten state with heating, it becomes easy to form many small cells with higher stability than in case of the above foam, consequently affording greater freedom in setting the production conditions, making possible the production of a more satisfactory foam with higher stability and giving improved stable heat-insulating properties to the foam. The present invention has been accomplished based on these findings.

SUMMARY OF THE INVENTION

The present invention concerns the following subjects:

(1) A process for producing a synthetic resin foam composed of cells having substantially two sizes, one of the sizes being at most 0.3 mm and the other size being 0.4 to 1 mm, comprising the steps of:

forming a mixture of a water-absorbent high molecular compound, a cell controlling agent and a synthetic resin;

kneading and melting the mixture with heating;

incorporating water together with a volatile-type foaming agent into the mixture under pressure; and extruding the mixture into a lower pressure space to form a foam.

(2) A process for producing a synthetic resin foam composed of cells having substantially two sizes, one of the sizes being at most 0.3 mm and the other size being 0.4 to 1 mm, comprising the steps of:

forming a mixture of a water-absorbent high molecular compound, a cell controlling agent and a synthetic resin;

adding water little by little to the mixture while or after mixing the mixture;

introducing the mixture into an extruder;

kneading and melting the resulting mixture with heating;

incorporating a volatile-type foaming agent into the mixture under pressure; and extruding the mixture into a lower pressure space to form a foam.

(3) A process for producing a synthetic resin foam composed of cells having substantially two sizes, one of the sizes being at most 0.3 mm and the other size being 0.4 to 1 mm, comprising the steps of:

forming a mixture of water, a cell controlling agent and a synthetic resin;

adding a water-absorbent high molecular compound to the mixture and mixing them;

introducing the mixture into an extruder;

kneading and melting the mixture with heating;

incorporating a volatile-type foaming agent into the mixture under pressure; and extruding the mixture into a lower pressure space to form a foam.

(4) A process for producing a synthetic resin foam composed of cells having substantially two sizes, one of the sizes being at most 0.3 mm and the other size being 0.4 to 1 mm, comprising the steps of:

forming a mixture of water a synthetic resin;

adding a water-absorbent high polymer molecular compound and a cell controlling agent;

introducing the mixture into an extruder;

kneading and melting the mixture with heating;

incorporating a volatile-type foaming agent into the mixture under pressure; and extruding the mixture into a lower pressure space to form a foam.

DESCRIPTION OF THE PREFERRED EMBODIMENTS

Figure 1:
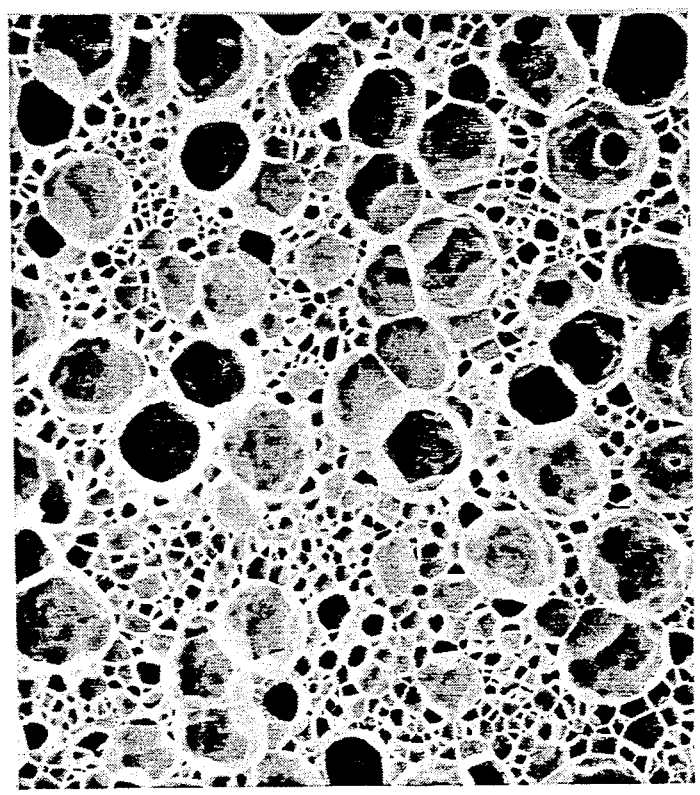
FIG. 1 is a scanning electron microscopic photograph enlarged (magnification 30) for the purpose to describe the internal structure of the synthetic resin foam obtained in Example 4.

In accordance with the processes of the present invention, a synthetic resin foam is obtained by Process (I) wherein (b) a water-absorbent high molecular compound and (c) a cell controlling agent are added to (a) a synthetic resin; the mixture is melted an mixed together with heating; a volatile-type foaming agent and (d) water are pressure incorporated into the mixture; and the mixture is extruded into a lower pressure space; Process (II) wherein (b) a water-absorbent high molecular compound and (c) a cell controlling agent are added to (a) a synthetic resin; (d) water is added little by little to the mixture while or after mixing the mixture; the mixture is introduced into an extruder; a volatile-type foaming agent is pressure incorporated into the mixture; and the mixture is extruded into a lower pressure space; Process (III) wherein (a) a synthetic resin, (d) water and (c) a cell controlling agent are mixed; (b) a water-absorbent high molecular compound is added thereto; subsequently the resulting mixture is introduced into an extruder; the mixture is melted and mixed with heating; a volatile-type foaming agent is pressure incorporated into the kneaded mixture; and the mixture is extruded into a lower pressure space; or Process (IV) wherein (a) a synthetic resin and (d) water are mixed together; (b) a water-absorbent high molecular compound and (c) a cell controlling agent are added thereto; the mixture is introduced into an extruder; the mixture is melted and mixed with heating; a volatile-type foaming agent is pressure incorporated into the mixture; and the mixture is extruded into a lower pressure space so that mainly both cells with at most 0.3 mm cell size and cells with 0.4 to 1 mm cell size can be dispersed with the intervention of cell membranes in an island-in-sea way. The foam having the above cell structure exhibits excellent heat-insulating properties, high flexibility and desirable flexural strength.

The production of a foam having a cell structure contemplated by the present invention requires the foregoing components (a) to (d). Among them, it is essential that 0.05 to 2 parts (parts by weight, hereinafter referred to as the same) of the (b) water-absorbent high molecular compound and 0.05 to 1.5 parts of (d) water is used based upon 100 parts of the synthetic resin.

According to the present invention, it is thought that the water-absorbent high molecular compound acts on water which is pressure incorporated into a mixture to generate cells having a cell size of at most 0.3 mm.

The reason why cells having a cell size of at most to 0.3 mm can be efficiently produced will presumably be as follows although still remaining fully clarified. The water being incorporated under pressure into the water-absorbent high molecular compound, which is uniformly dispersed in the synthetic resin by kneading and melting with heat, is probably microscopically and uniformly dispersed in the synthetic resin to provide minute sites of nuclei for forming cells having a cell size of at most 0.3 mm. The water-absorbent high molecular compound also facilitates the control of cell size to further decrease the size of cells having a size of at most 0.3 mm. The cell size of the fine cells thus formed are at most 0.3 mm, preferably at most 0.2 mm, more preferably at most 0.1 mm.

In order to be uniformly disperse the water-absorbent high molecular compound in the synthetic resin, it is preferable that the particle size of the water-absorbent high molecular compound is sufficiently small. The particle size of such compound is suitably at most 250 μm, preferably 5 to 70 μm, more preferably 5 to 20 μm.

The water-absorbent high molecular compound is not specifically limited insofar as the water-absorbent high molecular compound has a capacity for absorbing at least 200 g, preferably 400 to 1000 g of pure water per unit weight (1 g). Examples of the water-absorbent high molecular compound are, for instance, polyacrylic acid salts, starch-acrylic acid salt graft copolymers, vinyl alcohol-acrylic acid copolymers, polyvinyl alcohol resins, etc. The present invention, however, is not limited to these examples. Typical examples of the polyacrylic acid salts are, for instance, AQUALIC® CA ML-10 commercially available from Nippon Shokubai Kagaku Kogyo Co., Ltd., AQUA KEEP commercially available from Sumitomo Seika Co., Ltd., and the like.

The amount of the water-absorbent high molecular compound to be used is usually 0.05 to 2 parts, preferably 0.1 to 0.8 part, per 100 parts of the synthetic resin because if the amount is less than 0.05 part, the foam obtained tends to have a reduced number of fine cells even when an increased amount of water is present, and further because if the amount is more than 2 parts, there is a tendency that fine cells would not be formed.

There is no necessity that the water-absorbent high molecular compound is a completely dry product and can be a product absorbing some water. However, the amount of absorbed water is preferably smaller to ensure the uniform dispersion of the compound in the synthetic resin. When the water-absorbent high molecular compound contains such an amount of absorbed water that it is still freely flowable, the amount of water to be added is the amount of water to be pressure incorporated in minus the amount of absorbed water. If the amount of water to be pressure incorporated is less than 0.05 part or more than 1.5 parts, a cell structure wherein large and small cells are conjointly present as satisfactorily dispersed therein for giving a foam improved in properties such as thermal conductivity and bending deflection would not be formed. It is therefore desirable to adjust the amount of water to be pressure incorporated to usually 0.05 to 1.5 parts, preferably to 0.2 to 0.7 part.

The water can be used singly but may contain an alcohol according to the invention. When alcohol-containing water is used, advantage that the ranges of extrusion foaming conditions come to be wide to facilitate the production of the synthetic resin foam. Preferably, the alcohol-containing water is such that the amount of water is predominant. More preferably, the alcohol forms an azeotropic mixture with water. For example, the combination of water and tert-butyl alcohol is desirable.

The cell controlling agent for use in the present invention is one already known for use in extrusion foaming. Examples of the cell controlling agents are, for instance, finely divided talc, finely divided calcium carbonate, and the like. These agents can be used singly or in admixture thereof. It is desirable to adjust the particle size of the cell controlling agent to usually 3 to 100 μm, preferably 5 to 20 μm. The agent is mainly used in order to control the cell size to 0.4 to 1.0 mm. The amount of the cell controlling agent to be used is 0.01 to 5 parts, preferably 0.01 to 2 parts, more preferably 0.05 to 0.5 part, per 100 parts of the synthetic resin. If the amount is less than 0.01 part, larger cells will be formed, failing to give the desired heat-insulating properties, whereas when the amount exceeds 5 parts, it tends to excessively decrease the cell size, making it difficult to realize the desired density (at most $5 \times 10^{-2}$ g/cm$^3$).

According to the present invention, it is desirable to use a phenolic antioxidant along with the cell controlling agent.

Although the mechanism and functions of the phenolic antioxidant for use in the present invention has not yet been clarified in detail, the antioxidant appears to enhance the effect to promote formation of small cells, consequently facilitating determination of the production conditions. Among the phenolic antioxidants, hindered phenolic antioxidants are useful. More preferable are hindered phenols having a melting point of at least 100° C. and a high molecular weight since these phenols exhibit an outstanding stabilizing effect.

Typical examples of high-molecular-weight hindered phenols are, for instance, 1,3,5-tris(3,5-di-tert-butyl-4-hydroxy-benzyl)-S-triazine-2,4-6-(1H,3H,5H)trione, tetrakis[methylene(3,5-di-tert-butyl-4-hydroxyhydrocinnamate)]methane, etc., which, however, are not limitative. More specific examples of such high-molecular-weight hindered phenols are, for instance, MARK AO-20 and MARK AO-60 commercially available from ADEKA ARGUS CHEMICAL CO., LTD, and the like.

When the phenolic antioxidant is used in an amount of less than 0.02 part per 100 parts by weight of the synthetic resin, it is difficult for the antioxidant to exhibit an effect to stabilize the cell structure, whereas the amount exceeding 1 part tend to present difficulty in forming fine cells. Accordingly, the amount of the antioxidant is usually 0.02 to 1 part, preferably 0.05 to 0.5 part, more preferably 0.1 to 0.25 part.

The desired synthetic resin foam of the present invention can be prepared by one of the following Processes (I) to (IV).

(I) A process comprising preparing predetermined amounts of a synthetic resin, a water-absorbent high molecular compound and a cell controlling agent to give a mixture, kneading and melting with heating, thereafter pressure incorporating (forcing) a predetermined amount of a volatile-type foaming agent and water into the mixture, and extruding the resulting mixture into a lower pressure space to form a foam.

When this process is restored to, the foaming agent and water can be forced in at the same time or separately. Thus, the method of addition is not limited speicifically.

(II) A process comprising adding the water-absorbent high molecular compound and the cell controlling agent to the synthetic resin, adding water little by little to the mixture while or after mixing the mixture, introducing the mixture into an extruder, kneading and melting the resulting mixture with heating, thereafter pressure incorporating the volatile-type foaming agent into the kneaded mixture, and extruding the mixture into a lower pressure space to form to foam.

When water is added little by little, it is desirable to uniformly mix the water with the synthetic resin, the water-absorbent high molecular compound and the cell controlling agent in order to avoid the localized presence of water due to direct contact with the water-absorbent high molecular compound. More specifically, it is desirable to apply the water little by little, to the water-absorbent high molecular compound in the state that the water-absorbent high molecular compound is uniformly and microsopically dispersed in the synthetic resin.

(III) A process comprising mixing the synthetic resin, water and the cell controlling agent, mixing the mixture with addition of the water-absorbent high molecular compound, subsequently introducing the resulting mixture into an extrunder, keading and melting the mixture with heating, pressure incorporating the volatile-type foaming agent into the kneaded mixture, and extruding the mixture into a lower pressure space to form a foam.

When this process is employed, it is desirable to beforehand mix the synthetic resin, water and the cell controlling agent together uniformly as well as possible to prevent the water from localizing due to direct contact with the water-absorbent high molecular compound.

(IV) A process comprising mixing the synthetic resin with water, thereafter mixing the mixture with addition of the water-absorbent high molecular compound and the cell controlling agent, subsequently introducing the resulting mixture into an extruder, kneading and melting the mixture with heating, presure incorporating the volatile-type foaming agent into the kneaded mixture, and extruding the mixture into a lower pressure space to form a foam.

When this process is employed, it is desirable to beforehand mix the water and the synthetic resin together so that the water can be dispersed in the synthetic resin uniformly as well as possible before the addition of the water-absorbent high molecular compound to prevent the water from localizing due to direct contact with the water-absorbent high molecular compound in the same manner as in Processes (II) and (III).

In addition to the synthetic resin, the water-absorbent high molecular compound, the cell controlling agent and water, the forementioned phenolic antioxidant and known additives such as flame retardant, e.g., hexabromocyclodecane and lubricant can be added to the mixture as occasion demands.

There are no specific limitations concerning the temperature at which the synthetic resin, the water-absorbent high molecular compound, the cell controlling agent and water are melted and kneaded with heating and the period of time and means for kneading. The heating temperature is preferably at least the temperature at which the synthetic resin melts and is usually 150° to 250° C. Although the kneading time cannot be determined straightforwardly since the kneading time varies with the extrusion output per unit time, kneading means, and the like, it is usually such a period of time as is required for uniformly dispersing the synthetic resin, the water-absorbent high molecular compound and the cell controlling agent. The kneading means is not specifically limited insofar as it is one usually used for extrusion foaming such as a screw extruder.

The volatile-type foaming agent to be used in the present invention is one generally used for extrusion foaming. Examples of the foaming agents are, for instance, Frons such as dichlorodifluoromethane, 1-chloro-1,1-difluoro-ethane (hereinafter referred to as "Fron 142") which is said to be less likely to destroy the ozone layer in the atmosphere and 1-chloro-1,2,2,2-tetrafluoroethane; halogenated hydrocarbons represented by methyl chloride and the like; saturated hydrocarbons represented by propane, butane, and the like. These foaming agents are used singly, or at least two of them are used in admixture.

The volatile-type foaming agent is used in an amount of 0.1 to 0.3 mole, preferably 0.15 to 0.25 mole, based upon 100 g of the synthetic resin. If the amount of the foaming agent is less than 0.1 mole, the foam obtained will shrink greatly after extrusion, while the amount exceeds 0.3 mole, it tends to impair the dimensional stability of the foam.

After the incorporation of the volatile-type foaming agent under pressure and the incorporation of the specified amount of water under pressure or addition thereof, the resulting mixture is treated by a usual method such as a method comprising extruding the mixture through a slit die or the like of a foaming device to give a synthetic resin foam mainly composed of cells having a cell size of at most 0.3 mm and cells having a cell size of 0.4 to 1 mm.

In the foam thus produced, the cells having a cell size of at most 0.3 mm and the cells having a cell size of 0.4 to 1 mm do not form separate layers each other but form a structure of an island-in-sea structure wherein the cells having a cell size of 0.4 to 1 mm form islands, and the cells having a cell size of at most 0.3 mm form the sea, or a structure wherein cells having a cell size of at most 0.3 mm are dispersed in the state of directly surrounding the cells having a cell size of 0.4 to 1.0 mm with intervention of cell membranes.

The reason for the fact that a synthetic resin foam produced in the present invention has a low heat conductivity is supposed to be due to that while in conventional synthetic resin foams having a uniform cell structure, a flow of heat transfers through the uniform cell structure, in the synthetic resin foam prepared in the present invention, such a flow of heat will presumably be divided and blocked off by the fine cells having a cell size of at most 0.3 mm which exist aroung the cells having a cell size of 0.4 to 1.0 mm. Further the suitable bending characteristics, i.e. flexural strength and bending deflection, of the present foam appear attributable to the fact that the stress acting on the cell membranes is distributed by the fine cells having a cell size of at most 0.3 mm and scattering, for example, in the island-in-sea structure as mentioned above.

Thus, in the foam prepared by the process of the present invention, mainly cells having to cell size of at most 0.3 mm and cells having a cell size of 0.4 to 1 mm are dispersed, for example, in an island-sea state. It is thought that the fine cells having a cell size of at most 0.3 mm afford reduced thermal conductivity and increased bending deflection, and that the cells having a cell size of 0.4 to 1 mm permit the foam to retain flexural strength. The cells having a cell size of at most 0.3 mm and the cells having a cell size of 0.4 to 1 mm are not locally present but uniformly dispersed. It is thought that the above structure brings excellent properties such as reduction in thermal conductivity, increase in bending deflection and suitable flexural strength.

According to the present invention, the numerical values identifying greater size cells and smaller size cells rather mean relative to each other. The present invention substantially resides in providing, not in concept but in actuality, a novel excellent foam which possesses both the features of the greater cells and the smaller cells.

With respect to the proportions of the cells having a cell size of at most 0.3 mm in size and the cells having a cell size of 0.4 to 1.0 mm constituting the foam, it is desirable that the ratio of the area occupied by the cells having a cell size of at most 0.3 mm in the sectional area of the foam is 10 to 80%, preferably 20 to 70%, more preferably 30 to 70%. If the area ratio of the cells having a cell size of at most 0.3 mm is less than 10%, flexibility is lowered, whereas if it exceeds 80%, there is a tendency that mechanical strength such as flexural strength and compression strength deteriorates.

The synthetic resin foam of the present invention is not limited specifically in thickness. However, to impart the desired heat-insulating properties, flexural strength and bending deflection to the foam, it is more preferable in the form of a thick material such as a plate-like material having a thickness of usually 10 to 150 mm than in the form of a thin material such as a sheet. For use as the base of "tatami" mats, it is desired that the foam be, for example, 10 to 40 mm in thickness.

It is preferable that the density of the sythetic resin foam according to the present invention is about $2 \times 10^{-2}$ to about $5 \times 10^{-2}$ g/cm$^3$ so that lightweight and excellent heat-insulating properties and flexural strength can be imparted to the foam.

As already stated, the present foam is excellent in heat-insulating properties and suitable in flexural strength and bending deflection, and is therefore suited for use as a heat-insulating material, floor material and the like for wood houses of which great bending deflection is required in construction.

Although the processes of the present invention for producing synthetic resin foams will be described in greater detail with reference to the following examples, the present invention is not limited to the these examples.

EXAMPLE 1

To 100 parts of polystyrene (commercial name: ES-TYRENE G-17, product of Shinnittetsu Kagaku Co., Ltd., melt index: 3.1) were added 0.2 part of a water-absorbent high molecular compound (CA ML-10, product of Nippon Shokubai Kagaku Kogyo Co., Ltd., average particle size 10 μm) and 0.1 part of talc serving as a cell controlling agent, and the materials were fed to an extruder having an inside diameter of 65 mm. While kneading the materials with heating at 200° C., 9 parts of a volatile-type foaming agent composed of 70% by weight of methyl chloride and 30% by weight of propane, and 0.5 part of water were forced into the mixture, followed by kneading. The mixture was thereafter cooled to about 110° C. and extruded into a space under atmospheric pressure through a slit with a clearance of 2.0 mm to obtain a synthetic resin foam in the form of a plate having a thickness of 40 to 60 mm.

The foam obtained was checked by the following methods for properties, i.e. occupied area ratio (the ratio of area occupied by cells having a cell size of at most to 0.3 mm, hereinafter sometimes referred to merely as "area ratio"), density, thermal conductivity, flexural strength and bending deflection at break.

OCCUPIED AREA RATIO (1) A vertical section of the foam is photographed at a magnification of 30 with a scanning electron microscope (Model S-450, product of Hitachi, Ltd.), and a copy is made of the photograph using a dry copying machine.

(2) A black ink is applied to the cells larger than 9 mm in diameter in the direction of thickness (vertical direction in the photograph) of the copy (primary treatment).

(3) The image resulting from the primary treatment is processed by an image processing apparatus (Model PIAS-II, product of Pias Co.).

(4) The primary treated image is reproduced in simulated colors and divided in two regions according to the color density over a predetermined region.

(5) The dark color areas with at most 900 pixels (images) (corresponding in area to the cells having a cell size of at most 0.3 mm) are changed to light.

(6) The area occupied by the cells larger than 9 mm (dark areas separated off as such) in the whole image is determined using "FRACTAREA (area ratio)" in the function of an image analyzer computer (image-analysis computer).

Occupied area ratio (%) =

$$1 - \frac{\text{Number of pixels in dark areas}}{\text{Number of pixels in whole image region}} \times 100$$

DENSITY

The density of a foam is calculated from the following equation:

[Density of foam] = (weight of foam)/(volume of foam)

THERMAL CONDUCIVITY

It is measured in accordance with JIS A-9511.

FLEXURAL STRANGTH AND BENDING DEFLECTION AT BREAK

They are measured in accordance with JIS A-9511.

EXAMPLES 2-6 AND COMPARATIVE EXAMPLES 1 TO 4

Synthetic resin foams were prepared in the same manner as in Example 1 with the exception of using varying amounts of water-absorbent high molecular compound, cell controlling agent, water and foaming agent as listed on Table 1.

The foams obtained were checked for properties in the same method as in Example 1. The result are shown in Table 1.

Figure 2:
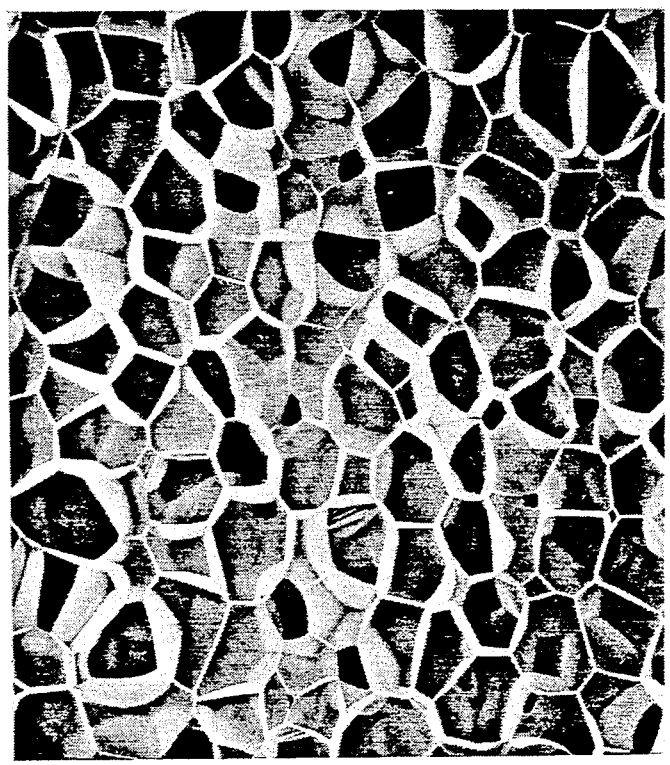
FIG. 2 is a scanning electron microscopic photograph to describe the internal structure of the synthetic resin foam obtained in Comparative Example 4.

FIGS. 1 and 2 are photomicrographs taken at a magnification of 30 of a vertical section of the foams obtained in Example 4 and Comparative Example 4, respectively with a scanning electron microscope (Model S-4501, product of Hitachi, Ltd.).

As shown in FIG. 1, the synthetic resin foam according to the present invention has an island-in-sea structure wherein the cells having a cell size of at most 0.3 mm, especially at most to 0.1 mm are approximately uniformly distributed around the cells having a cell size of 0.4 to 1 mm with intervention of cell membranes.

In contrast, as shown in FIG. 2, the conventional synthetic resin foam is composed of uniform cells of approximately the same size.

TABLE 1

| | Materials for synthetic resin foam | | | | | Properties of synthetic resin foam | | | | |
|---|---|---|---|---|---|---|---|---|---|---|
| | Water-absorbent high molecular compound[*1] (part) | Cell controlling agent[*2] (part) | Water (part) | Foaming agent (mole) A | B | Occupied area ratio (%) | Density (g/cm$^3$) | Thermal conductivity (Kcal/mhr °C.) | Flexural strength (kg/cm$^3$) | Blending deflection at break (mm) |
| Ex. No. | | | | | | | | | | |
| 1 | 0.2 | 0.1 | 0.5 | Propane 0.068 | CH$_3$Cl 0.12 | 30 | $2.95 \times 10^{-2}$ | 0.028 | 2.6 | 50 |
| 2 | 0.75 | 0.1 | 0.6 | Propane 0.068 | CH$_3$Cl 0.12 | 15 | $2.9 \times 10^{-2}$ | 0.029 | 2.6 | 40 |
| 3 | 0.2 | 0.1 | 0.25 | Propane 0.068 | CH$_3$Cl 0.12 | 25 | $2.95 \times 10^{-2}$ | 0.028 | 2.5 | 45 |
| 4 | 0.2 | 0.1 | 0.5 | Propane 0.095 | CH$_3$Cl 0.089 | 45 | $3.5 \times 10^{-2}$ | 0.021 | 5.0 | 35 |
| 5 | 0.2 | 0.7 | 0.5 | Fron-142b 0.095 | CH$_3$Cl 0.06 | 15 | $2.8 \times 10^{-2}$ | 0.026 | 2.6 | 60 |
| 6 | 0.25 | 0.1 | *3 0.45 | Fron-142b 0.095 | CH$_3$Cl 0.089 | 25 | $3.5 \times 10^{-2}$ | 0.022 | 4.5 | 30 |
| Comp. Ex. No. | | | | | | | | | | |
| 1 | — | 0.2 | — | Propane 0.068 | CH$_3$Cl 0.12 | 0 | $2.9 \times 10^{-2}$ | 0.032 | 2.5 | 20 |
| 2 | — | 0.1 | 0.5 | Propane 0.068 | CH$_3$Cl 0.12 | at most 5 | $2.8 \times 10^{-2}$ | 0.033 | 2.5 | 20 |
| 3 | 2.5 | 0.1 | 0.5 | Propane 0.068 | CH$_3$Cl 0.12 | 0 | $3.0 \times 10^{-2}$ | 0.032 | 2.7 | 15 |
| 4 | — | 0.2 | — | Fron-142b 0.095 | CH$_3$Cl 0.06 | 0 | $3.5 \times 10^{-2}$ | 0.024 | 5.5 | 17 |

(Notes)
*1CA ML-10 commercially available from Nippon Shokubai Kagaku Kogyo Co., Ltd.
*2Talc (average particle size: 6 μm)
*3Mixture of 68.5% by weight of water and 31.5% by weight tert-butyl alcohol (azeotropic point: 79.2° C.)

From the results shown in, Table 1, it can be understood that the density of the foam according to the present invention is about 10% lower than that of Comparative Examples corresponding to the composition, and the foam according to the present invention is excellent in heat-insulating properties and great in bending deflection at break. Especially in bending deflection at break, the foams of Comparative Examples are about 20 mm, whereas those of the invention are as great as 35 to 45 mm and are therefore highly flexible.

EXAMPLE 7

To 100 parts of polystyrene resin (commercial name: ESTYRENE G-17, commercially available from Shinnittetsu Kagaku Co., Ltd., melt index: 3.1) were added 0.2 part of a water-absorbent high molecular compound (CA ML-10 commercially available from Nippon Shokubi Kagaku Kogyo Co., Ltd., average particle size: 10 μm) and 0.1 part of talc serving as a cell controlling agent. The mixture was stirred in a ribbon blender for 5 minutes, and 0.5 part of water placed in a beaker was added dropwise to the mixture, followed by mixing further for 10 minutes.

The mixture obtained was then fed to an extruder having an inside diameter of 65 mm, and 9 parts of a volatile-type foaming agent consisting of 70% by weight of methyl chloride and 30% by weight of propane was forced into the mixture while kneading the mixture with heating at 200° C. The resulting mixture was kneaded, thereafter cooled to about 110° C., and extruded into a space under atmospheric pressure through a slit with a clearance of 2.0 mm to obtain a synthetic resin foam in the form of a plate having a thickness of 40 to 60 mm.

The foam prepared was checked for properties, i.e. occupied area ratio, density, thermal conductivity, flexural strength and bending deflection at break, in the same methods as in Example 1. The foam obtained was found to be comparable to the foam obtained in Example 1 in occupied area ratio, density, thermal conductivity, flexural strength and bending deflection at break and had the same cell structure as the foam obtained Example 1.

EXAMPLE 8

To 100 parts of polystyrene resin (commercial name: ESTYRENE G-17, commercially available from Shinnittetsu Kagaku Co., Ltd., melt index: 3.1) were added 0.2 part of water-absorbent high molecular compound (CA ML-10, commercially available from Nippon Shokubai Kagaku Kogyo Co., Ltd., average particle size: 10 μm) and 0.1 part of talc serving as a cell controlling agent. While stirring the mixture in a ribbon blender, 0.5 part of water placed in a beaker was added dropwise to the mixture, followed by mixing further for 10 minutes.

The mixture obtained was then fed to an extruder having an inside diameter of 65 mm, and 9 parts of a volatile-type foaming agent consisting of 70% by weight of methyl chloride and 30% by weight of propane was forced into the mixture while kneading the mixture with heating at 200° C. The resulting mixture was kneaded, thereafter cooled to about 110° C., and extruded into a space under atmospheric pressure through a slit with a clearance of 2.0 mm to obtain a synthetic resin foam in the form of a plate having a thickness of 40 to 60 mm.

The foam prepared was checked for properties, i.e. occupied area ratio, density, thermal conductivity, flexural strength and bending deflection at break in the same methods as in Example 1. The foam obtained was found to be comparable to the foam obtained in Example 1 in area ratio, density, thermal conductivity, flexural strength and bending deflection at break and had the same cell structure as the foam obtained in Example 1.

EXAMPLE 9

To 100 parts of polystyrene resin (commercial name: ESTYRENE G-17, commercially available from Shin-nittetsu Kagaku Co., Ltd., melt index: 3.1) were added 0.5 part of water and 0.1 part of talc serving as a cell controlling agent, and the materials were thoroughly mixed together. The mixture was thereafter mixed with addition of 0.2 part of a water-absorbent high molecular compound (CA-ML-10, commercially available from Nippon Shokubai Kagaku Kogyo Co., Ltd., average particle size: 10 μm). The resulting mixture was fed to an extruder having an inside diameter of 65 mm, and 9 parts of a volatile-type foaming agent consisting of 70% by weight of methyl chloride and 30% by weight of propane was forced into the mixture while kneading the mixture with heating at 200° C.

The mixture was kneaded, thereafter cooled to about 110° C., and extruded into a space under atmospheric pressure through a slit with a clearance of 2.0 mm to obtain a synthetic resin foam in the form of a plate having a thickness of 40 to 60 mm.

The foam obtained was checked for properties, i.e. occupied area ratio, density, thermal conductivity, flexural strength and bending deflection at break in the same methods as in Example 1. The foam obtained was found to be comparable to the foam obtained in Example 1 in area ratio, density, thermal conductivity, flexural strength and bending deflection at break and had the same cell structure as the foam of Example 1.

EXAMPLE 10

To 100 parts of polystyrene resin (commercial name: ESTYRENE G-17, commercially available from Shin-nittetsu Kagaku Co., Ltd., melt index: 3.1) was added 0.5 part of water, and the resin was thoroughly stirred to uniformly disperse the water therein. To the mixture were thereafter added 0.2 part of a water-absorbent high molecular compound (CA ML-10, commercially available from Nippon Shokabai Kagaku Kogyo Co., Ltd., average particle size: 10 μm) and 0.1 part of talc serving as a cell controlling agent. The materials were then fed to an extruder having an inside diameter of 65 mm, and 9 parts of a volatile-type foaming agent consisting of 70% by weight of methyl chloride and 30% by weight of propane was forced into the mixture while kneading the mixture with heating at 200° C. The resulting mixture was kneaded, thereafter cooled to about 110° C. and extruded into a space under atmospheric pressure through a slit with a clearance of 2.0 mm to prepare a synthetic resin foam in the form of a plate having a thickness of 40 to 60 mm.

The foam obtained was checked for properties, i.e. occupied area ratio, density, thermal conductivity, flexural strength and bending deflection at break in the same methods as in Example 1. The foam obtained was found to be comparative to the foam obtained in Example 1 in area ratio, density, thermal conductivity, flexural strength and bending deflection at break and had the same cellular structure as the foam obtained in Example 1.

EXAMPLE 11

To 100 parts of polystyrene resin (commercial name: ESTYRENE G-17, commercially available from Shin-nittetsu kagaku Co., Ltd., melt index: 3.1) were added 0.25 part of a water-absorbent high molecular compound (AQUALIC® CA ML-10, commercially available from Nippon Shokubai Kagaku Kogyo Co., Ltd., average particle size: 10 μm), 0.20 part of a phenolic antioxidant (MARK AO-20, commercially available from ADEKA ARGUS CHEMICAL CO., LTD) and 0.1 part of talc serving as a cell controlling agent. The mixture was fed to an extruder having an inside diameter of 65 mm, and 14 parts of a volatile-type foaming agent consisting of 70% by weight of Pron 142 and 30% by weight of methyl chloride, and 0.5 part of water were forced into the mixture while kneading the mixture with heating at 200° C. The resulting mixture was kneaded, thereafter cooled to about 110° C. and extruded into a space under atmospheric pressure through a slit with a clearance of 20 mm to prepare a synthetic resin foam in the form of a plate having a thickness of 40 to 60 mm.

The synthetic resin foam obtained was then checked for properties in the same manner as in Example 1. The results are shown in Table 2.

EXAMPLE 12 AND COMPARATIVE EXAMPLE 5

Synthetic resin foams were prepared in the same manner as in Example 11 with the exception of using the materials and changing the amounts of the antioxidant and the pressure incorporated water as shown in Table 2. A foam obtained in the same manner as in Comparative Example 5 with the exception of not using an antioxidant achieved approximately the same result as attained in Comparative Example 5.

The synthetic resin foams obtained were checked for properties in the same manner as in Example 11. The results are shown in Table 2.

TABLE 2

| | Materials for synthetic resin foam | | | | | | Properties of synthetic resin foam | | | | |
|---|---|---|---|---|---|---|---|---|---|---|---|
| | Water-absorbent high molecular compound*1 (part) | Antioxidant (part) | Cell controlling agent*2 (part) | Water (part) | Foaming agent (mole) A*4 | B | Occupied area ratio (%) | Density (g/cm$^3$) | Thermal conductivity (Kcal/mhr °C.) | Flexural strength (kg/cm$^3$) | Blending deflection at break (mm) |
| Ex. No. | | | | | | | | | | | |
| 11 | 0.25 | AO-20*2 0.20 | 0.1 | 0.5 | Fron-142b 0.095 | CH$_3$Cl 0.089 | 50 | $3.2 \times 10^{-2}$ | 0.020 | 4.0 | 40 |
| 12 | 0.25 | AO-60*3 0.20 | 0.3 | 0.5 | Fron-142b 0.095 | CH$_3$Cl 0.089 | 45 | $3.2 \times -10^2$ | 0.020 | 3.0 | 40 |
| Comp. Ex. | — | AO-60*3 | 0.3 | 0.5 | Fron-142b | CH$_3$Cl | At most | $3.2 \times 10^{-2}$ | 0.025 | 4.0 | 25 |

TABLE 2-continued

| Materials for synthetic resin foam | | | | | | Properties of synthetic resin foam | | | | |
|---|---|---|---|---|---|---|---|---|---|---|
| Water-absorbent high molecular compound*1 (part) | Antioxidant (part) | Cell controlling agent*2 (part) | Water (part) | Foaming agent (mole) A*4 | B | Occupied area ratio (%) | Density (g/cm³) | Thermal conductivity (Kcal/mhr °C.) | Flexural strength (kg/cm³) | Blending deflection at break (mm) |
| 5 | 0.20 | | | 0.095 | 0.089 | 5 | | | | |

(Notes)
*1AQUALAC ® CA ML-10 commercially available from Nippon Shokubai Kagaku Kogyo Co., Ltd.
*2"AO-20" refers to MARK AO-20 commercially available from ADEKA ARGUS CHEMICAL CO., LTD.
*3"AO-60" refers to MARK AO-60 commercially available from ADEKA ARGUS CHEMICAL CO., LTD.
*4Talc (average particle size of 6 μm)

Because the synthetic resin foam obtained in the present invention is excellent in heat insulating properties and has desirable flexural strength and bending deflection, favorably used as a usual heat-insulating material for use in wood houses which require bending deflection when being worked for application.

In addition to the ingredients used in the examples, other ingredients can be used in the examples as set forth in the specification to obtain substantially the same results.

What is claimed is:

1. A process for producing a synthetic resin foam composed of cells having two sizes, one of the sizes being at most 0.3 mm and the other size being 0.4 to 1 mm, comprising the steps of:
    forming a mixture of a water-absorbent high molecular weight organic compound having the capacity of absorbing at least 200 g of pure water per one gram of the compound, a cell controlling agent and a synthetic resin;
    kneading and melting the mixture with heating;
    incorporating water together with a volatile-type foaming agent into the mixture under pressure; and
    extruding the mixture into a lower pressure space to form a foam.

2. The process of claim 1, wherein the amount of the water-absorbent high molecular weight compound is 0.05 to 2 parts by weight and the amount of the cell controlling agent is 0.01 to 5 parts by weight based upon 100 parts by weight of the synthetic resin.

3. The process of claim 1, wherein the amount of the water is 0.05 to 1.5 parts by weight based upon 100 parts by weight of the synthetic resin.

4. The process of claim 1, wherein the synthetic resin is a styrenic resin.

5. The process of claim 1, wherein the synthetic resin foam is a plate-like material having a density of $2 \times 10^{-2}$ to $5 \times 10^{-2}$ g/cm³ and a thickness of 10 to 150 mm.

6. The process of claim 1, wherein the water contains alcohol.

7. The process of claim 1, wherein the mixture contains a phenolic antioxidant in an amount of 0.02 to 1 part by weight based upon 100 parts by weight of the synthetic resin.

8. The process of claim 7, wherein the phenolic antioxidant is a hindered phenolic compound.

9. A process for producing a synthetic resin foam composed of cells having two sizes, one of the sizes being at most 0.3 mm and the other size being 0.4 to 1 mm, comprising the steps of:
    forming a mixture of a water-absorbent high molecular weight organic compound having the capacity of absorbing at least 200 g of pure water per one gram of the compound, a cell controlling agent and a synthetic resin;
    adding water little by little to the mixture while or after mixing the mixture;
    introducing the mixture into an extruder;
    kneading and melting the resulting mixture with heating;
    incorporating a volatile-type foaming agent into the mixture under pressure; and
    extruding the mixture into a lower pressure space to form a foam.

10. The process of claim 9, wherein the amount of the water-absorbent high molecular weight compound is 0.05 to 2 parts by weight and the amount of the cell controlling agent is 0.01 to 5 parts by weight based upon 100 parts by weight of the synthetic resin.

11. The process of claim 9, wherein the amount of the water is 0.05 to 1.5 parts by weight based upon 100 parts by weight of the synthetic resin.

12. The process of claim 9, wherein the synthetic resin is a styrenic resin.

13. The process of claim 9, wherein the synthetic resin foam is a plate-like material having a density of $2 \times 10^{-2}$ to $5 \times 10^{-2}$ g/cm³ and a thickness of 10 to 150 mm.

14. The process of claim 9, wherein the water contains alcohol.

15. The process of claim 9, wherein the mixture contains a phenolic antioxidant in an amount of 0.02 to 1 part by weight based upon 100 parts by weight of the synthetic resin.

16. The process of claim 15, wherein the phenolic antioxidant is a hindered phenolic compound.

17. A process for producing a synthetic resin foam composed of cells having two sizes, one of the sizes being at most 0.3 mm and the other size being 0.4 to 1 mm, comprising the steps of:
    forming a mixture of water, a cell controlling agent and a synthetic resin;
    adding a water-absorbent high molecular weight organic compound having the capacity of absorbing at least 200 g of pure water per one gram of the compound to the mixture and mixing them;
    introducing the mixture into an extruder;
    kneading and melting the mixture with heating;
    incorporating a volatile-type foaming agent into the mixture under pressure; and
    extruding the mixture into a lower pressure space to form a foam.

18. The process of claim 17, wherein the amount of the water-absorbent high molecular weight compound is 0.05 to 2 parts by weight and the amount of the cell controlling agent is 0.01 to 5 parts by weight based upon 100 parts by weight of the synthetic resin.

19. The process of claim 17, wherein the amount of the water is 0.05 to 1.5 parts by weight based upon 100 parts by weight of the synthetic resin.

20. The process of claim 17, wherein the synthetic resin is a styrenic resin.

21. The process of claim 17, wherein the synthetic resin foam is a plate-like material having a density of $2\times 10^{-2}$ to $5\times 10^{-2}$ g/cm$^3$ and a thickness of 10 to 150 mm.

22. The process of claim 17, wherein the water contains alcohol.

23. The process of claim 17, wherein the mixture contains a phenolic antioxidant in an amount of 0.02 to 1 part by weight based upon 100 parts by weight of the synthetic resin.

24. The process of claim 23, wherein the phenolic antioxidant is a hindered phenolic compound.

25. A process for producing a synthetic resin foam composed of cells having two sizes, one of the sizes being at most 0.3 mm and the other size being 0.4 to 1 mm, comprising the steps of:

forming a mixture of water and a synthetic resin;
adding a water-absorbent high molecular weight organic compound having the capacity of absorbing at least 200 g of pure water per one gram of the compound and a cell controlling agent to the mixture;
introducing the mixture into an extruder;
kneading and melting the resulting mixture with heating;
incorporating a volatile-type foaming agent into the mixture under pressure; and
extruding the mixture into a lower pressure space to form a foam.

26. The process of claim 25, wherein the amount of the water-absorbent high molecular weight compound is 0.05 to 2 parts by weight and the amount of the cell controlling agent is 0.01 to 5 parts by weight based upon 100 parts by weight of the synthetic resin.

27. The process of claim 25, wherein the amount of the water is 0.05 to 1.5 parts by weight based upon 100 parts by weight of the synthetic resin.

28. The process of claim 25, wherein the synthetic resin is a styrenci resin.

29. The process of claim 25, wherein the synthetic resin foam is a plate-like material having a density of $2\times 10^{-2}$ to $5\times 10^{-2}$ g/cm$^3$ and a thickness of 10 to 150 mm.

30. The process of claim 25, wherein the water contains alcohol.

31. The process of claim 25, wherein the mixture contains a phenolic antioxidant in an amount of 0.02 to 1 part by weight based upon 100 parts by weight of the synthetic resin.

32. A synthetic resin foam composed of cells having substantially two sizes, one of the sizes being at most 0.3 mm and the other size being 0.4 to 1 mm, produced by the process of claim 1, claim 9, claim 17 or claim 25.

33. A process for producing a synthetic resin foam composed of cells having two sizes, one of the sizes being at most 0.3 mm and the other size being 0.4 to 1 mm, comprising the steps of: (1) forming a mixture of a water-absorbent high molecular weight compound selected from the group consisting of polyacrylic salts, starch acrylic acid salt graft copolymers, vinyl alcohol-acrylic acid copolymers, and polyvinyl alcohol resin; a cell controlling agent; and a synthetic resin; (2) kneading and melting the mixture with heating; (3) incorporating water together with a volatile-type foaming agent into the mixture under pressure; and (4) extruding the mixture into a lower pressure space to form a foam.

34. The process of claim 33 wherein the amount of the water-absorbent high molecular weight compound is 0.05 to 2 parts by weight and the amount of the cell controlling agent is 0.01 to 5 parts by weight based upon 100 parts by weight of the synthetic resin.

35. The process of claim 33 wherein the synthetic resin is a styrenic resin.

36. A process for producing a synthetic resin foam composed of cells having two sizes, one of the sizes being at most 0.3 mm and the other size being 0.4 to 1 mm, comprising the steps of: (1) forming a mixture of water, a water-absorbent high molecular weight compound selected from the group consisting of polyacrylic salts, starch acrylic acid salt graft copolymers, vinyl alcohol-acrylic acid copolymers, and polyvinyl alcohol resin, a cell controlling agent, and a synthetic resin; (2) kneading and melting the mixture with heating; (3) incorporating water together with a volatile-type foaming agent into the mixture under pressure; and (4) extruding the mixture into a lower pressure space to form a foam.

* * * * *